United States Patent [19]
Winters

[11] Patent Number: 6,148,929
[45] Date of Patent: Nov. 21, 2000

[54] FEELER ROD FOR WATER MAINS

[76] Inventor: Larry Winters, 4171 N. 21st St., Milwaukee, Wis. 53209

[21] Appl. No.: 09/314,258

[22] Filed: May 18, 1999

[51] Int. Cl.[7] .................................. B25C 1/02; B25D 1/00
[52] U.S. Cl. .............................. 173/91; 173/90; 173/132; 173/211
[58] Field of Search ................... 173/90, 91, 132, 173/128, 1, 126, 211; 114/293, 294, 230; 227/147

[56] References Cited

U.S. PATENT DOCUMENTS

| | | |
|---|---|---|
| 492,608 | 2/1893 | Kratz . |
| 532,008 | 1/1895 | Neu . |
| 716,274 | 12/1902 | Peirce, Jr. . |
| 1,014,295 | 1/1912 | Gibb et al. ................... 173/91 |
| 2,010,575 | 8/1935 | White . |
| 2,147,828 | 2/1939 | Daniels . |
| 3,117,378 | 1/1964 | Bowen . |
| 3,735,822 | 5/1973 | Deike ........................ 173/91 |
| 4,315,551 | 2/1982 | Iannone . |
| 4,483,058 | 11/1984 | Clutter et al. . |
| 4,557,409 | 12/1985 | Hecock et al. ............... 227/147 |
| 4,703,549 | 11/1987 | Grandt ...................... 173/91 |
| 4,960,064 | 10/1990 | Mestas et al. . |
| 5,088,567 | 2/1992 | Schnell et al. .............. 173/90 |
| 5,097,912 | 3/1992 | Bowers ..................... 173/90 |
| 5,542,479 | 8/1996 | Stachler et al. . |
| 5,613,458 | 3/1997 | Owen . |
| 5,699,864 | 12/1997 | Dvorak et al. . |

Primary Examiner—Scott A. Smith
Attorney, Agent, or Firm—Andrus, Sceales, Starke & Sawall, LLP

[57] ABSTRACT

A manually operated leak detection device used in locating fluid leaks in a ground surface includes an elongated rod and a handle transversely fixed thereto. The invention is improved by fixing an anvil on the rod; slidably mounting a first collar on the rod above the anvil; slidably mounting a second collar on the rod below the anvil; connecting and spacing the first and second collars by a pair of parallel guide rods passing through the anvil, each of the guide rods lying on one side of the rod; providing a protective sheath over the anvil, the first and second collars and the guide rods, the sheath being connected to the second collar; and slidably mounting a handle over the rod and a top portion of the first collar, the handle being secured to the sheath at the top of the first collar. The rod is manually and sequentially driven into the ground surface in the vicinity of the fluid leak by repeated forceful engagement of the first collar against the anvil without the need for a separate driving tool, and the guide rods and the sheath act to stabilize the rod in the area of impact between the first collar and the anvil.

12 Claims, 3 Drawing Sheets

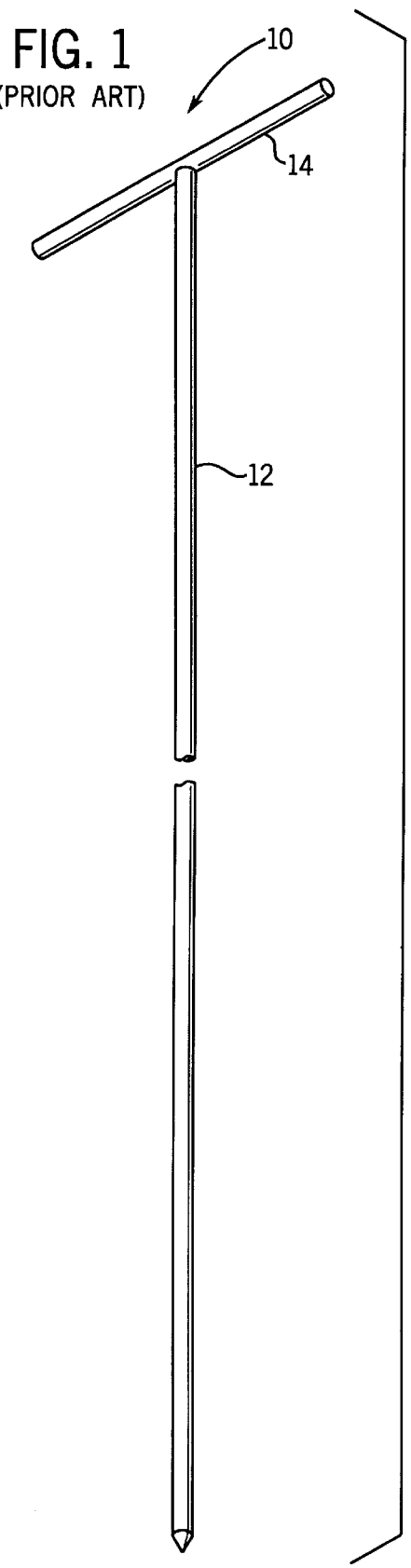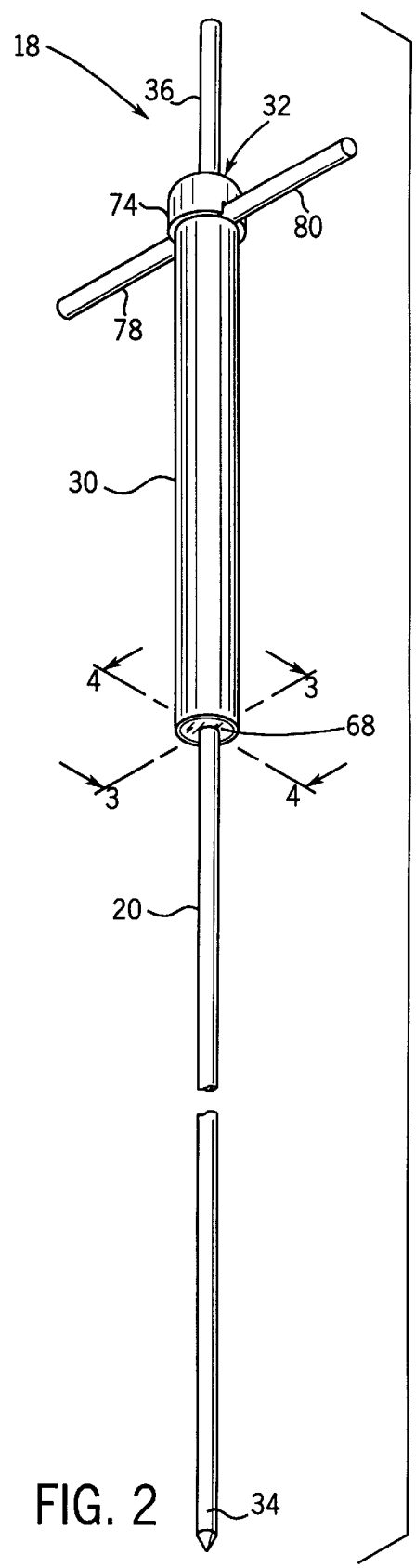
FIG. 1 (PRIOR ART)
FIG. 2

U.S. Patent    Nov. 21, 2000    Sheet 2 of 3    6,148,929
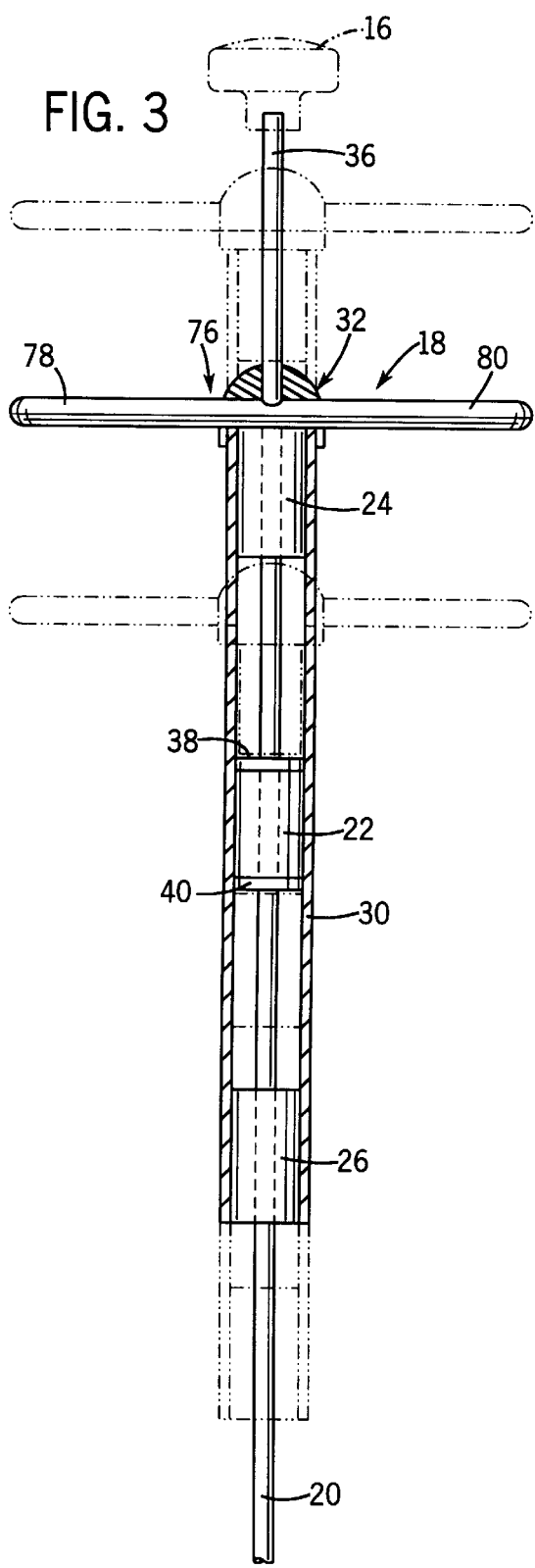
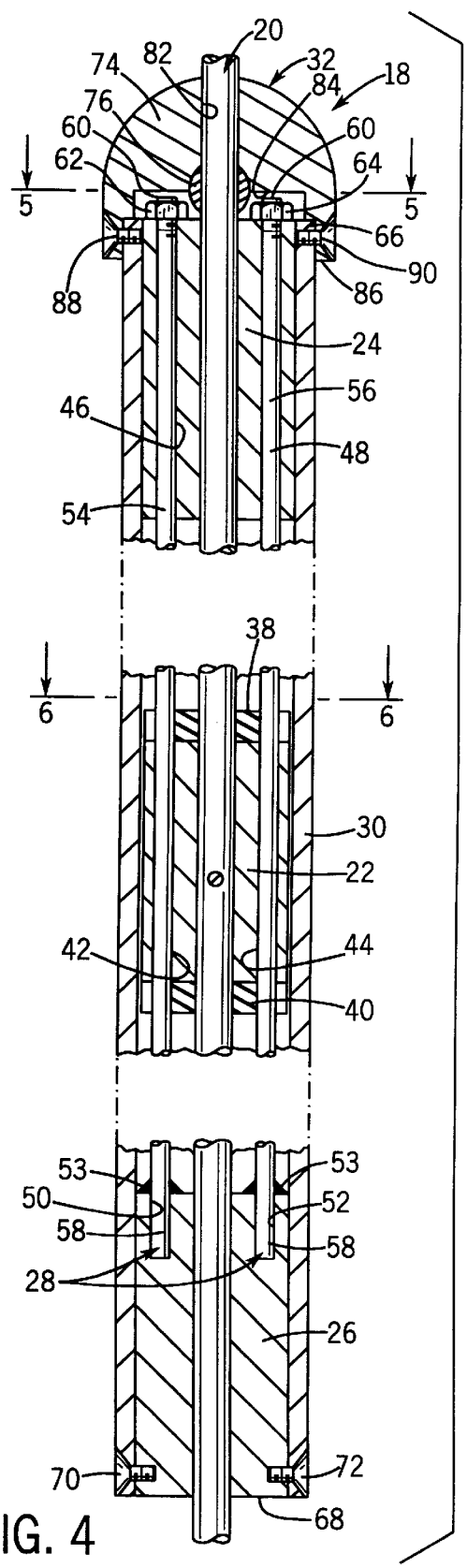

FEELER ROD FOR WATER MAINS

FIELD OF THE INVENTION

This invention relates broadly to a leak detection tool used in the locating of a ground-based fluid leak, and more particularly, pertains to a feeler rod used in detecting a broken and leaking utility line, such as a water main.

BACKGROUND OF THE INVENTION

Underground water mains are typically buried eight feet below the surface of the ground in order to make certain they are located below the frost line of the soil. These mains and service laterals extending from the water main to residential areas or businesses are continuously breaking or having pools formed therein as a result of age, earth subsidence or the effects of severe weather, particularly cold weather. Such leaks are often noticed when leaking water runs along the main or lateral, and then flows upwardly to reach the ground surface.

In order to identify the exact location of the leak along the water main, the following procedure is generally followed. A truck-mounted drill rig is used to break through the pavement or upper surface above the water main, and drill a short distance into the earth. It is not possible for the truck-mounted rig to drill all the way to the water main due to the likelihood that the drill would strike and damage the water main. Thereafter, a long T-shaped rod, known as a feeler rod, is pushed or driven into the ground by hand and into surface contact with the water main. An electric or mechanical listening device, such as an earpiece or a headphone, is attached to the top of the rod to detect the hissing sound of rushing, leaking water transmitted through the metal water main and metal rod. The same procedure is followed in a second hole and subsequent holes to determine whether such holes have been drilled in a location away from (fainter water rushing sounds) or toward (stronger water rushing sounds) the site of the leak. By drilling a series of holes and driving a number of feeler rods, the exact location of the leak may be determined. Once the leak is found, the ground is carefully excavated at that point to expose the water main and the leak is repaired.

The use of the standard T-shaped feeler rod is extremely arduous due to the pushing downward or pulling downward exertions necessary to move the rod through hard ground, clay and rock into contact with the water main. Severe cold weather adds significant difficulty in inserting the rod into the earth. In typical fashion, at least one worker, and often two, push the rod incrementally into the ground applying all their weight or using a sledgehammer to advance the rod into the ground. Then, the rod is pulled upwardly before being driven downwardly again for a short distance. Because the length of these rods is typically eight to ten feet, it sometimes can take an hour or so before the rod approaches the leak. This method of repeatedly pushing and pulling the rod can cause bodily injuries with terrible strain to the back, arms, shoulders and groin area of the workers performing the leak detecting task.

Accordingly, it is desirable to provide a manually operated leak detection device which is more efficient and safer than the constructions of the prior art. It is also desirable to provide a feeler rod which is continuously driven into the ground adjacent a water main without the need for retracting the rod or using a separate driving tool. It is further desirable to provide a leak detection device which is economically produced and simple to operate.

SUMMARY OF THE INVENTION

It is one object of the present invention to present a feeler rod which is effectively used in the detection of the fluid leak.

It is another object of the present invention to provide a leak detection device which is useful to utilities, contractors, municipalities, and plumbers.

It is also an object of the present invention to incorporate and improve a slide hammer structure into a conventional feeler rod.

It is a further object of the present invention to provide a low tech tool which does not require air or electricity to operate.

Yet another object of the present invention is to offer a leak detection device which increases the stability of the rod and improves the transmission of the leaking fluid sounds.

In one aspect of the invention, a manually operated leak detection device used in the locating of fluid leaks in the ground surface includes a separate tool driven elongated rod and a handle transversely fixed thereto. The improvement resides in fixing an anvil on the rod; slidably mounting a first collar on the rod above the anvil; slidably mounting a second collar on the rod below the anvil; connecting and spacing first and second collars by means of a pair of parallel, guide rods passing through the anvil, each guide rod lying on one side of the rod; providing a protective sheath over the anvil, the first and second collars and the guide rods, the sheath being connected to the second collar; slidably mounting a handle over the rod and a top portion of the first collar, the handle being secured to the sheath at the top of the first collar. With this structure, the rod is manually and sequentially driven into the ground surface in the vicinity of the fluid leak by repeated forceful engagement of the upper collar against the anvil, without the need for a separate driving tool, and the guide rods and the sheath act to stabilize the rod in the area of impact between the first collar and the anvil. The handle has a central portion provided with outwardly extending handle grip portions. The anvil is cylindrically shaped and has an upper contact surface and a lower contact surface, both surfaces being provided with impact cushioning material. The first collar is cylindrically shaped and is similarly sized relative to the anvil. The second collar is cylindrically shaped and similarly sized relative to the first collar and the anvil. The guide rods have lower ends which are embedded in the second collar and upper ends which are releasably secured to the first collar. The upper ends of the guide rods extend over the top of the first collar and are externally threaded to receive nuts which are drawn tightly against the top of the first collar. The rod has a lower end with a generally pointed configuration for piercing the ground, and an upper end adapted to receive a listening device for detecting the sounds of flowing fluid representative of the leak. The sheath is a tubular member having a top end connected to the handle by first set screw means and a bottom end joined to the second collar by second set screw means. The sheath is telescoped over the anvil, the first and second collars, and the guide rods. The first and second collars are substantially equi-distantly spaced from the anvil.

In another aspect of the invention, a manually operated drivable and retractable feeler rod is provided for locating fluid leaks in a ground surface. The feeler rod includes an elongated, solid rod having a lower end portion provided with a generally pointed configuration adapted to pierce the ground surface, and an upper end portion adapted to engage a listening device thereon. An anvil is fixed to the rod in the vicinity of the upper end portion thereof, the anvil having an upper contact surface and a lower contact surface. An upper collar is slidably mounted on the rod above the anvil and defines a driving hammer engageable with the upper contact surface of the anvil. A lower collar is slidably mounted on the rod below the anvil and defines a retraction hammer engageable with the lower contact surface of the anvil. A pair of parallel guide rods extend between the upper and lower collars and pass through the anvil on opposite sides of the rod. A tubular sheath is telescoped over the anvil, the upper and lower collars, and the guide rods, and is connected to the lower collar. A handle extends generally transversely to the rod and has a central portion receiving the rod therethrough and is connected to the sheath. The handle has a pair of handle grip portions extending outwardly from the central portion. The upper and lower collars, the handle and the sheath form a sliding structure movable with limited travel along a longitudinal axis of the rod. The sheath prevents the entry of foreign material and engagement of one's hands between the anvil and the respective upper and lower collars. The sheath amplifies the sounds of the fluid leaks in the ground surface through the listening device adapted to be mounted on the upper end of the rod.

In yet a further aspect of the invention, a leak detection device is used in locating fluid leaks in a ground surface and includes an elongated rod having a handle transversely attached thereto. The improvement includes an anvil fixed to the rod and having a pair of spaced openings formed therethrough. A first collar is slidably mounted on the rod in spaced relationship above the anvil for selective engagement therewith. A second collar is slidably mounted on the rod in spaced relationship below the anvil for selective engagement therewith. A guide rod structure extends between the first and second collars and passes through openings formed in the anvil on opposite sides of the rod. A sheath surrounds the anvil, the first and second collars, and the guide rod structure, and is connected to the second collar. A T-shaped handle has a central portion receiving the rod therethrough and covers an upper portion of the first collar, the central portion being connected to a top end of the sheath. Pushing downwardly on the handle and axially of the rod will cause the first collar to strike the anvil and drive the rod downwardly into the ground surface, pulling upwardly on the handle will cause the second collar to strike the anvil and retract the rod upwardly from the ground surface, and rotating the handle will cause the rod to rotate. The guide rod structure and the sheath act to rigidify the rod as axial and torsional forces are applied thereto.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of the prior art feeler rod;

FIG. 2 is a perspective view of the feeler rod embodying the present invention;

FIG. 3 is a cross-sectional view taken on line 3—3 of FIG. 2;

FIG. 4 is an enlarged, fragmentary, cross-sectional view taken on line 4—4 of FIG. 2;

DETAILED DESCRIPTION OF THE INVENTION

Figure 5:
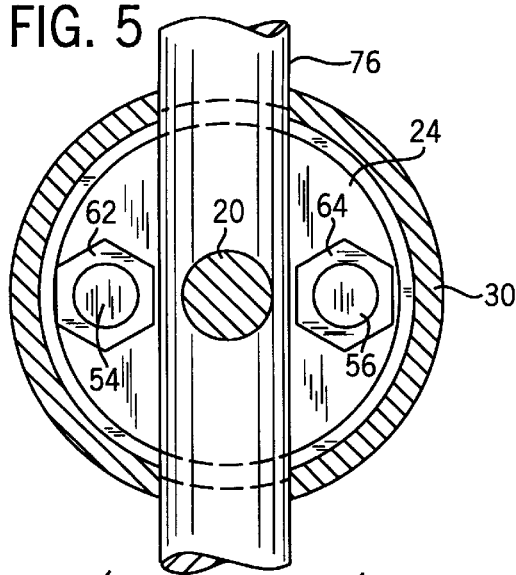
FIG. 5 is an enlarged, fragmentary, cross-sectional view taken on line 5—5 of FIG. 4.

Referring now to FIG. 1, there is shown a prior art feeler rod 10 which is comprised of an elongated solid rod 12 and a solid handle 14 fixed, such as by welding, to the top of the rod 12. The length of the rod 12 generally varies according to the depth of the water main located beneath a ground surface. A typical length of the rod 12 is eight to ten feet, it being understood that the longer the rod, the more difficult it is to insert the same into the ground surface using the arduous push and pull manner set forth in the Background of the Invention. Both the rod 12 and the handle 14 are fabricated from a rigid metal material such as steel, which will withstand the forces applied along the longitudinal axis of the rod 10 during insertion and retraction of the rod 10 into the ground. Although not shown in FIG. 1, the prior art feeler rod 10 is generally used in conjunction with a commercially available listening device or sonoscope 16 or similar design of the type shown in phantom in FIG. 3.

FIGS. 2–6 illustrate the leak detection device of the present invention in the form of an improved feeler rod 18. FIG. 2 shows the external construction of the device, while FIGS. 3 and 4 depict the internal structure of the device.

The feeler rod 18 is comprised of an elongated, solid rod 20, a solid, cylindrical anvil 22, a first or upper cylindrical collar 24, a second or lower cylindrical collar 26, a guide rod structure 28, a protective, cylindrical, tubular sheet 30 and a handle 32. Preferably, all the components of the feeler rod 18 are comprised of metal.

Rod 20 has a lower end portion 34 formed with a generally pointed configuration for piercing a ground surface, and an upper end portion 36 adapted to engage the listening device 16 against the top of which an inspector places his or her ear to monitor the hissing or rushing sounds of leaking water beneath the ground surface. Anvil 22 is formed with a through bore receiving the rod 20 and is typically welded thereto in an upper section of the rod 20. Anvil 22 has an upper contact surface 38 and a lower contact surface 40, both of which are provided with an impact cushioning material such as rubber. Anvil 22 is also provided throughout its length with a pair of openings 42,44 lying parallel to the through bore, there being one opening on each side of the through bore, as seen in FIG. 4.

First or upper collar 24 is formed with a central bore so that the collar 24 is slidably mounted on the rod 20 above the anvil 22. Like the anvil 22, the collar 24 is provided with a set of apertures 46,48 which are aligned with the openings 42,44. Second or lower collar 26 is also drilled with a central passage so that collar 26 is slidably mounted on rod 20 below the anvil 22. Lower collar 26 is formed with a pair of depressions 50,52 which are aligned with the anvil openings 42,44.

Figure 6:
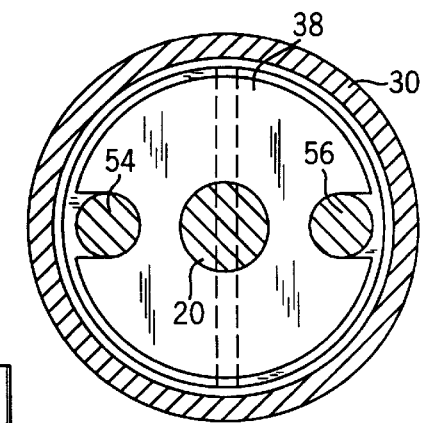
FIG. 6 is an enlarged, cross-sectional view taken on line 6—6 of FIG. 4.

Guide rod structure 28 includes a pair of parallel, guide rods 54,56, each having a lower end 58 embedded in lower collar depressions 50,52 and welded at 53 to a top surface of the lower collar 26. In addition, each of the guide rods 54,56 has an upper end which is externally threaded at 60 and extends above a top surface of the upper collar 24. The guide rods 54,56 pass through the anvil openings 42,44, as well as the upper collar apertures 46,48 and have nuts 62,64 (FIG. 4, FIG. 5) threadedly attached to the threaded upper ends 60 and drawn tightly against the top of the upper collar 24. Each guide rod 54,56 lies on one side of the rod 20 (FIG. 4, FIG. 6). In this manner, the upper collar 24 and the lower collar 26 are each held in spaced equi-distant relation from the anvil 22 fixed to the rod 20. The lower surface of upper collar 24 is selectively engageable with the upper contact surface 38 of anvil 22, and the upper surface of the lower collar 26 is selectively engageable with the lower contact surface 40 of the anvil 22.

The tubular protective sleeve 30 has an open top 66 and a closed bottom surface 68 which is provided with a central hole so that the sleeve 30 may be telescoped over the rod 20, the anvil 22, the upper and lower collars 24,26, and the guide rods 54,56. The lower end of the sheath 30 is releasably secured to the bottom of the lower collar 26 by set screws 70,72.

Handle 32 includes a rounded central portion 74 provided with a rubber covered handlebar 76 which passes therethrough and defines a pair of outwardly projecting handle grip portions 78,80. Central portion 74 is provided with a through opening 82 through which the rod 20 passes. As seen best in FIGS. 4 and 5, the rod 20 also extends through the midpoint in the handlebar 76. The underside of the central portion 74 is recessed at 84 so as to accommodate the threaded upper end 60 of the guide rods 54,56 and the nuts 62,64. The central portion 74 has a depending side wall structure 86 which fits over the open top of the sheath 30 where it is attached by set screws 88,90. In its assembled form, as shown in FIG. 2, the feeler rod 18 defines a sliding structure comprised of the upper and lower collars 24,26, the guide rods 54,56, the sheath 30 and the handle 32. The sliding structures slides along the rod 20 for a limited travel upwardly and downwardly as defined by the respective spacing between the upper collar 24 and the anvil 22, and the lower collar 26 and the anvil 22. The construction described above also enables the rotation of the rod 20 by turning the handle 32.

Figure 7:
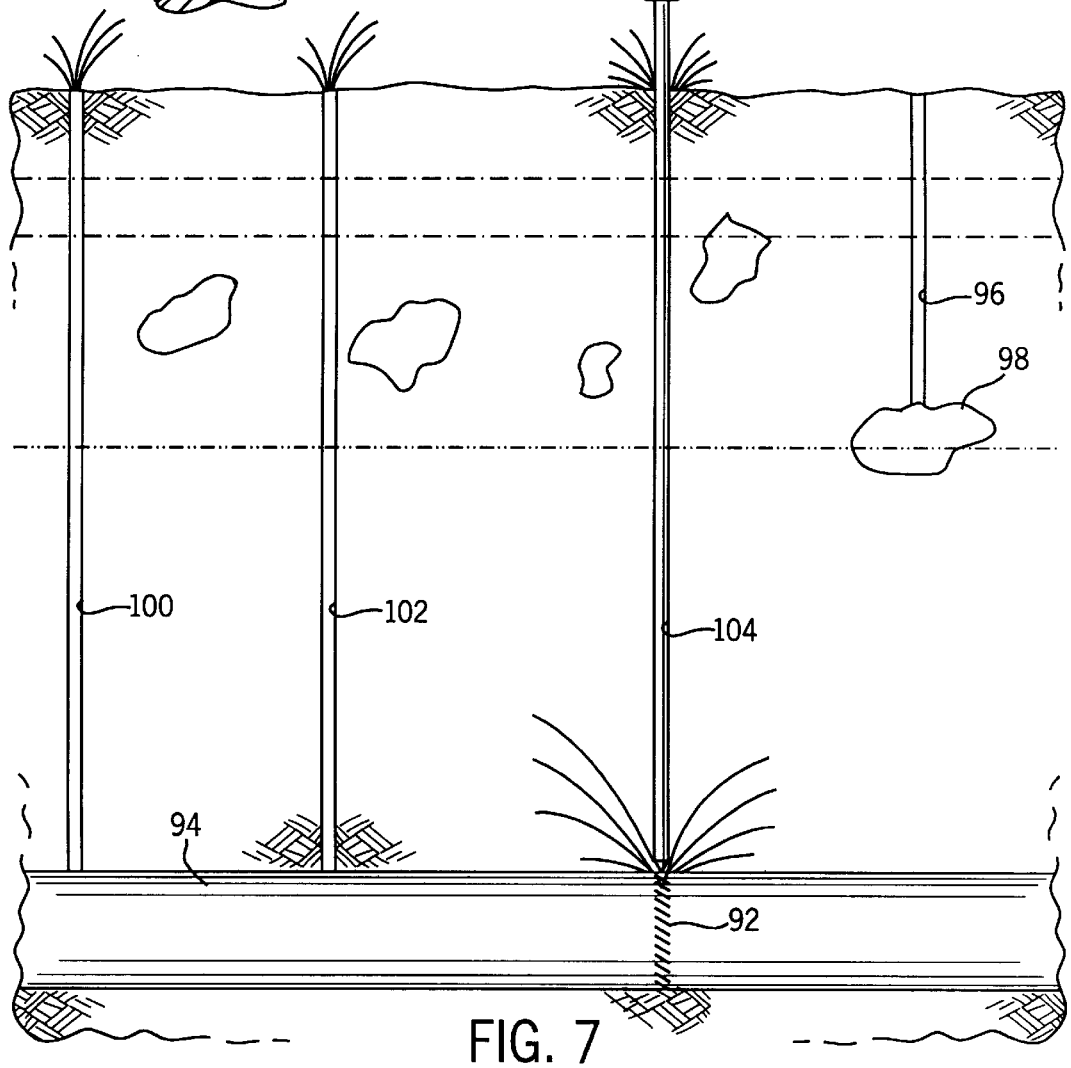
FIG. 7 is a pictorial representation of the feeler rod of the present invention as used in connection with the detection of fluid leaks in a ground surface.

FIG. 7 shows the exemplary manner in which the feeler rod 18 is employed in the detection of a leak from a break or fissure 92 in a water main 94 which is generally buried about eight feet below the surface of the ground. Upon arriving at the general vicinity of the water main leak, there may be some pooling of water which travels along the outer surface of the water main and rises to the surface The feeler rod 18 of the present invention is utilized to form several bores, each bore being typically started by a truck mounted drill rig (not shown) and formed progressively closer to the actual water main break. For example, a first bore 96 is formed until a rock 98 is encountered several feet below the surface. A second bore 100 is formed at a location spaced from the first bore 96. When the rod 20 approaches the main 94, an inspector listens to the vibration or sound of the leaking water, and is caused to move to a third bore 102 formed between the first and second bores. Again, as the rod 20 approaches the main 94, a further hissing signal is generated through the listening device 16 at the top of the rod 18. Finally, a fourth bore 104 is formed which is most closely located at the point of the fissure 92 and detected through the stronger rush of fluid heard in the listening device 16. The rod 20 is then withdrawn and the site is carefully excavated to repair the break.

In the formation of each of the bores 96,100,102,104, the bottom of feeler rod 20 is deposited in the partially formed, pre-drilled bore. In this condition, gravity causes the lower surface of upper collar 24 to rest upon the cushioned upper contact surface 38 of the anvil 22. With the pointed end of the rod 20 in the bore, a worker grasps the handle portion 78,80, pulls the sliding structure upwardly, and applies a downward force axially of the rod so that a driving force is transmitted via the anvil 22 to the rod 20. This motion is represented in phantom lines of FIG. 3. Without having to push the rod 20 upwardly as was required with the prior art device, the sliding structure is repeatedly drawn up along the rod 20 and pushed downwardly until the pointed end of the rod 20 reaches the main 94. The upper collar 24 thus acts as a driving hammer against the anvil 122. Once the location of the leak is pinpointed through the listening device 16, the rod 20 may be withdrawn in a reverse manner. That is, the sliding structure is drawn upwardly along the rod 20 until the upper surface of the lower collar 26 impacts against the cushioned lower impact surface of the anvil 22. Again, this procedure is repeated until the rod 20 is withdrawn from the bore. In this case, the lower collar 26 acts as a retraction hammer against anvil 22. If necessary, such as in the event of narrowly missing the water main 94, the rod 20 may be slightly bent by rotating the handle 32 so as to turn the rod 20.

It should be understood that the guide rods 54,56 and the sheath 30 cooperate to rigidify and stabilize the rod 20 as axial and torsional forces are applied. The sheath 30 also functions to prevent dirt and foreign material from becoming lodged between the collars 24,26 and the anvil 22, and keeps the worker's hands from being pinned or pinched between the moving and stationary components. It should be further appreciated that the sheath 30 acts to amplify the sounds of the leaking fluid along the rod 20 and transmit the same to the listening device 16.

While the preferred embodiment has been described relative to detecting a water main leak, it should be noted that the present invention could also be used in the detection of other fluids, such as gas. For this reason, the feeler rod 18 is useful to utilities, municipalities, contractors and plumbers. The present invention incorporates a sliding hammer into a feeler rod and further improves the structure by means of the guide rods 54,56 and protecting sheath 30.

While the invention has been described with reference to a preferred embodiment, those' skilled in the art will appreciate that certain substitutions, alterations and omissions may be made without departing from the spirit thereof. Accordingly, the foregoing description is meant to be exemplary only, and should not be deemed limitative of the scope of the invention set forth in the following claims.

Various alternatives and embodiments are contemplated as being within the scope of the following claims particularly pointing out and distinctly claiming the subject matter regarded as the invention.

I claim:

1. A manually operated, drivable and retractable feeler rod for locating fluid leaks in a ground surface, the feeler rod comprising:

an elongated solid rod having a lower end portion provided with a generally pointed configuration adapted to pierce the ground surface, and an upper end portion adapted to engage a listening device thereon;

an anvil fixed to the rod in the vicinity of upper end portion thereon, the anvil having an upper contact surface and a lower contact surface;

an upper collar slidably mounted on the rod above the anvil and defining a driving hammer engageable with the upper contact surface of the anvil;

a lower collar slidably mounted on the rod below the anvil and defining a retraction hammer engageable with the lower contact surface of the anvil;

a pair of parallel guide rods extending between the upper and lower collars and passing through the anvil on opposite sides of the rod;

a tubular sheath telescoped over the anvil, the upper and lower collars and the guide rods, and connected to the lower collar, and a handle extending generally transversely of the rod and having a central portion receiving the rod therethrough and connected to the sheath, and a pair of handle grip portions extending outwardly from the central portion.

2. The feeler rod of claim 1, wherein the upper and lower collars, the handle portion and the sheath form a sliding structure movable with limited travel along a longitudinal axis of the rod.

3. The feeler rod of claim 1, wherein the sheath prevents the entry of foreign material and engagement of one's hands between the anvil and the respective upper and lower collars.

4. The feeler rod of claim 1, wherein the sheath amplifies the sounds of the fluid leaks in the ground surface through the listening device adapted to be mounted on the upper end of the rod.

5. The improvement of claim 1, wherein the anvil is cylindrically shaped.

6. The improvement of claim 5, wherein the first collar is cylindrically shaped and is similarly sized relative to the anvil.

7. The improvement of claim 6, wherein the second collar is cylindrically shaped and is similarly sized relative to the first collar and the anvil.

8. The improvement of claim 1, wherein both contact surfaces of the anvil are provided with cushioning material.

9. The improvement of claim 1, wherein the guide rods have lower ends which are embedded in the second collar and upper ends which are releasably connected to the first collar.

10. The improvement of claim 9, wherein the upper ends of the guide rods extend over the top of the first collar and are externally threaded to receive nuts which are drawn tightly against the top of the first collar.

11. The improvement of claim 1, wherein the sheath is a tubular member having a top end connected to the handle by a first set screw means and a bottom end joined to the collar by a second screw means.

12. In a leak detection device used in locating fluid leaks in a ground surface, and including an elongated rod having a handle transversely attached thereto, the improvement comprising:

an anvil fixed to the rod and having a pair of spaced openings formed therethrough;

a first collar slidably mounted on the rod in spaced relationship above the anvil for selective engagement therewith;

a second collar slidably mounted on the rod in spaced relationship below the anvil for selective engagement therewith;

a guide rod structure extending between the first and second collars and passing through openings formed in the anvil on opposite sides of the rod;

a sheath surrounding the anvil, the upper and lower collars, the guide rod structure and connected to the second collar; and a T-shaped handle having a central portion receiving the rod therethrough and covering an upper portion of the first collar, the central portion being connected to a top end of the sheath, whereby pushing downwardly on the handle axially of the rod will cause the first collar to strike the anvil and drive the rod downwardly into the ground surface, pulling upwardly of the handle will cause the second collar to strike the anvil and retract the rod upwardly from the ground surface, and rotating the handle will cause the rod to rotate, the guide rod structure and the sheath acting to rigidify the rod as axial and torsional forces are applied thereto.

* * * * *